United States Patent
Chilli et al.

(10) Patent No.: US 9,422,195 B1
(45) Date of Patent: Aug. 23, 2016

(54) MAGNESIUM OXIDE CASTABLE REFRACTORY FOUNDRY LADLE LINERS

(71) Applicant: Universal Refractories, Inc., Wampum, PA (US)

(72) Inventors: William J. Chilli, Aliquippa, PA (US); Leroy F. Thompson, Slippery Rock, PA (US)

(73) Assignee: Universal Refractories, Inc., Wampum, PA (US)

(*) Notice: Subject to any disclaimer, the term of this patent is extended or adjusted under 35 U.S.C. 154(b) by 56 days.

(21) Appl. No.: 14/031,847

(22) Filed: Sep. 19, 2013

Related U.S. Application Data

(60) Provisional application No. 61/703,058, filed on Sep. 19, 2012.

(51) Int. Cl.
| | |
|---|---|
| C21C 7/00 | (2006.01) |
| C04B 35/04 | (2006.01) |
| B22D 41/02 | (2006.01) |

(52) U.S. Cl.
CPC ............... *C04B 35/04* (2013.01); *B22D 41/02* (2013.01)

(58) Field of Classification Search
CPC .................................. C04B 35/66; F27D 1/10
USPC .................................................. 266/280, 286
See application file for complete search history.

(56) References Cited

U.S. PATENT DOCUMENTS

| | | |
|---|---|---|
| 4,014,704 A | 3/1977 | Miller |
| 4,107,255 A | 8/1978 | Clishem et al. |
| 4,149,705 A | 4/1979 | Caudill |
| 4,400,474 A | 8/1983 | Copperthwaite et al. |
| 4,422,625 A | 12/1983 | Thurn |
| 4,618,079 A | 10/1986 | Barnes et al. |
| 5,104,833 A | 4/1992 | Matsumoto et al. |
| 5,135,896 A | 8/1992 | Vezza |
| 5,284,808 A | 2/1994 | Damiano et al. |
| 5,506,181 A | 4/1996 | Matsumoto et al. |
| 5,681,785 A | 10/1997 | Furuta et al. |
| 5,681,786 A | 10/1997 | Furuta et al. |
| 5,856,251 A | 1/1999 | Teranishi et al. |
| 5,932,506 A | 8/1999 | Bogan |
| 5,972,102 A | 10/1999 | Vezza |
| 6,165,926 A | 12/2000 | Kriechbaum et al. |
| 6,548,435 B1 | 4/2003 | Bugajski |
| 6,787,495 B2 | 9/2004 | Lally |
| 7,074,361 B2 | 7/2006 | Carolla et al. |
| 7,632,770 B2 | 12/2009 | Klishchat |
| 7,939,458 B2 | 5/2011 | Nakamura et al. |
| RE42,511 E | 7/2011 | Tremblay et al. |
| 2004/0132608 A1 | 7/2004 | Lally |
| 2010/0222201 A1 | 9/2010 | Teiken |

FOREIGN PATENT DOCUMENTS

| | | | | |
|---|---|---|---|---|
| GB | 2097378 A | * | 11/1982 | ............. B22D 41/32 |
| JP | 1990-195939 | * | 3/1992 | |

* cited by examiner

*Primary Examiner* — Scott Kastler
(74) *Attorney, Agent, or Firm* — Alan G. Towner, Esq.; Pietragallo Gordon Alfano Bosick & Raspanti, LLP

(57) ABSTRACT

Refractory foundry ladle liners made from castable magnesium oxide-based compositions are disclosed. The liner compositions include MgO-containing aggregate, $Al_2O_3$-containing aggregate, and an inorganic binder. The ladle liners are cast into shape, placed into ladle shells, and packed with sand. The foundry ladle assemblies, including the pre-cast MgO-based ladle liners, are reusable for multiple foundry operations.

20 Claims, 8 Drawing Sheets

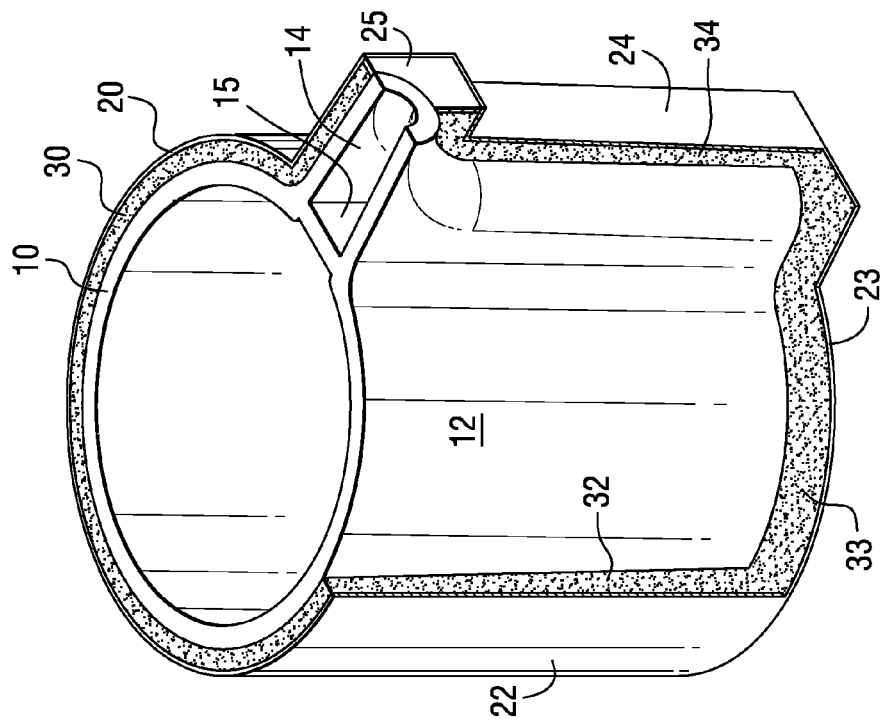
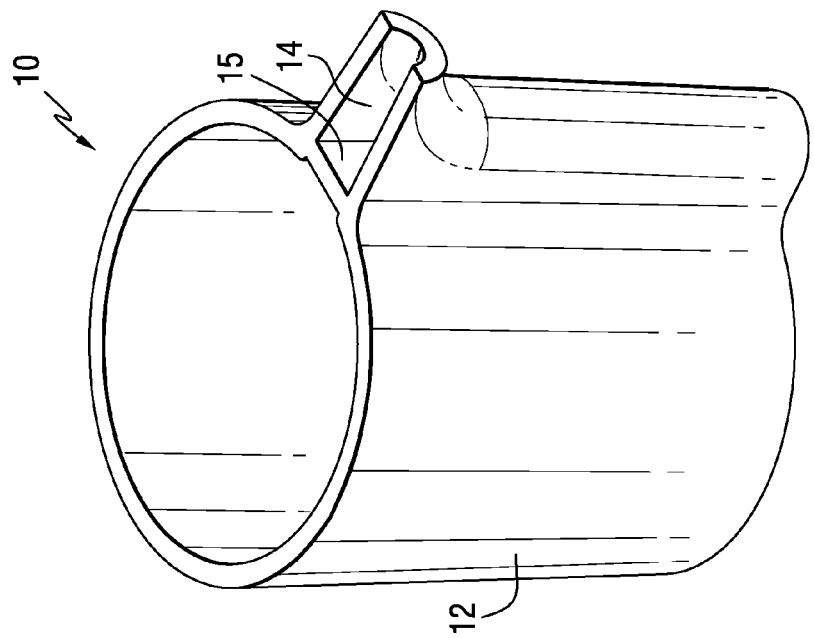
FIG. 2
FIG. 1

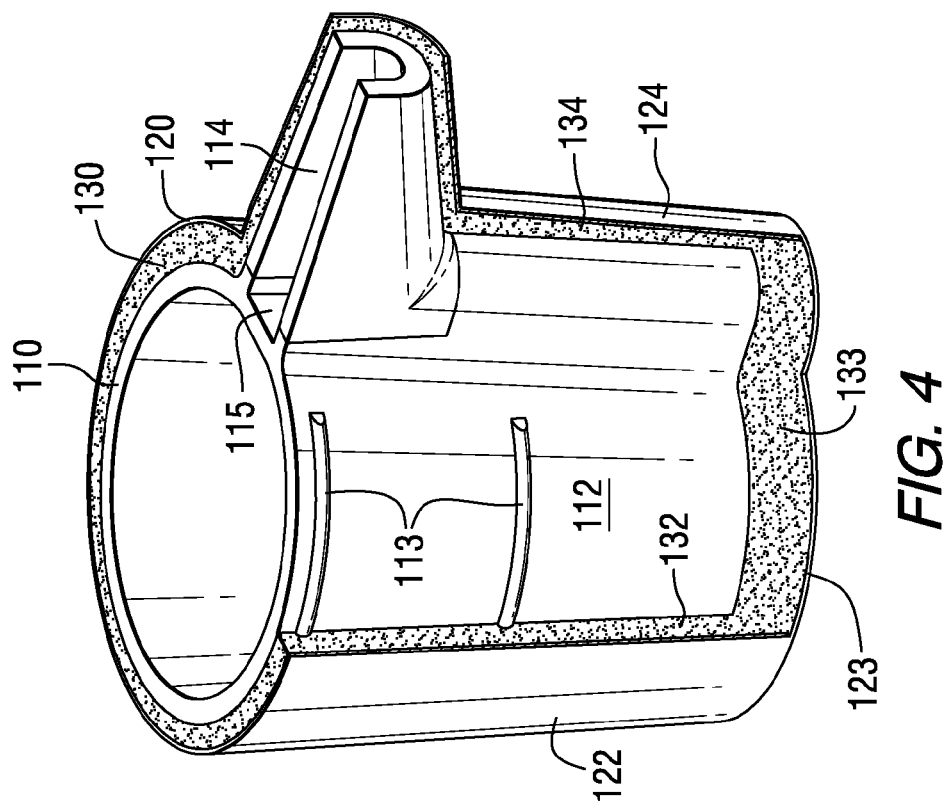
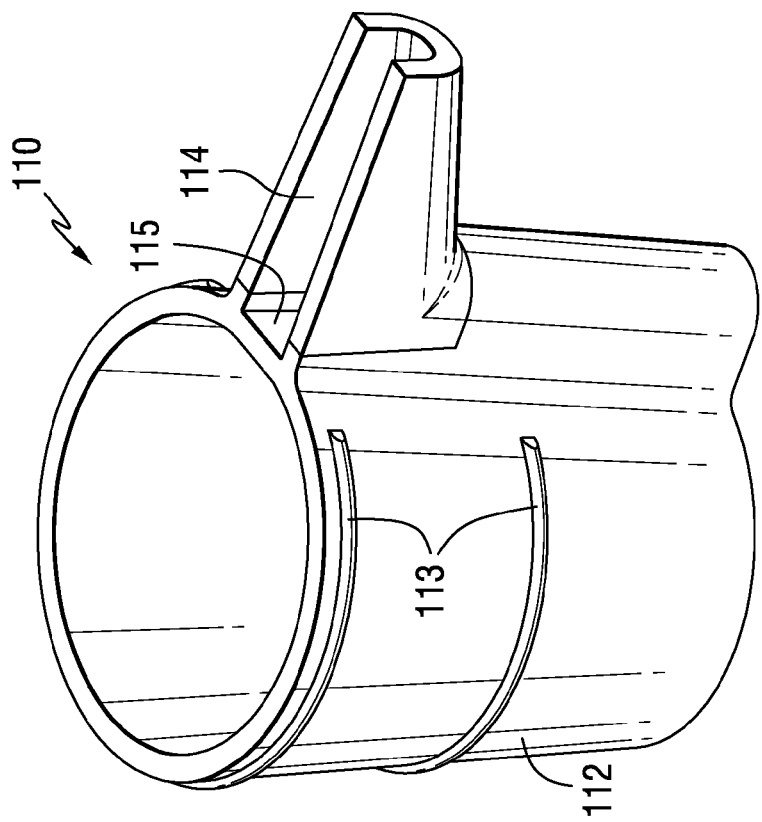

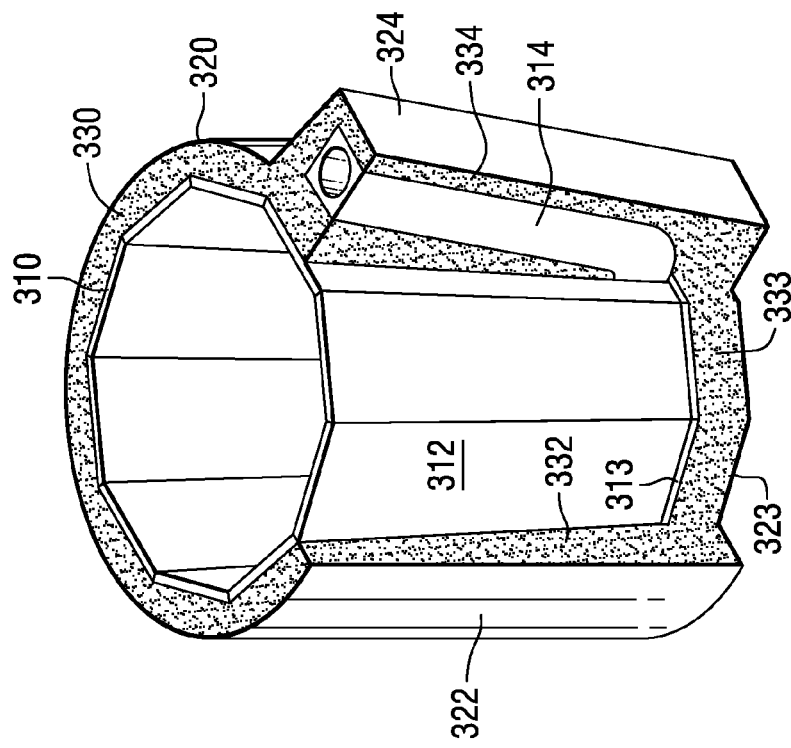
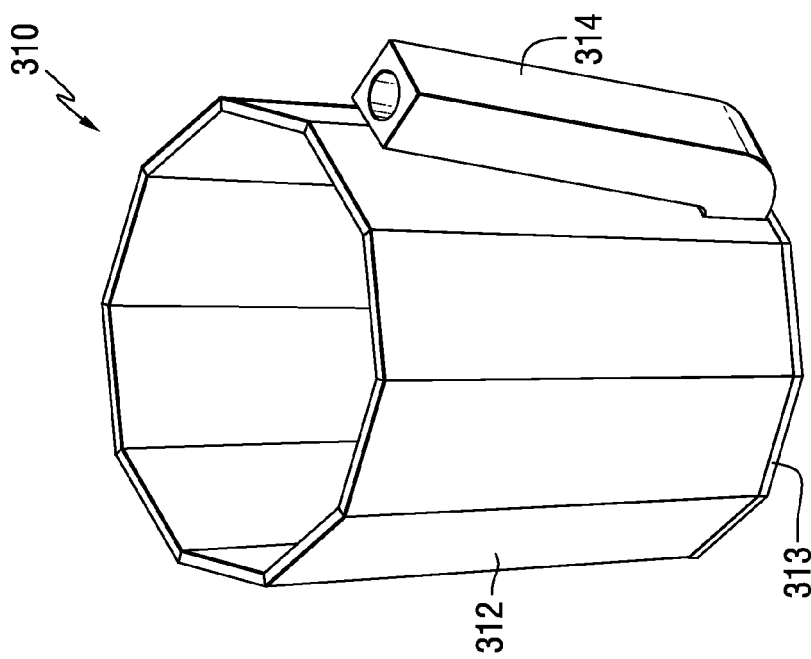

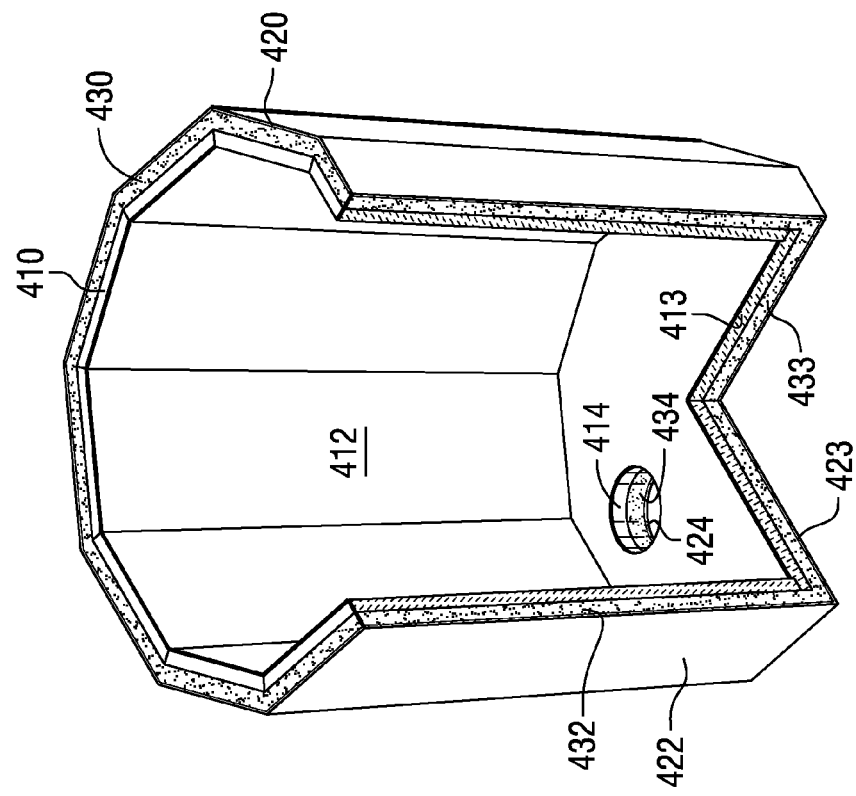
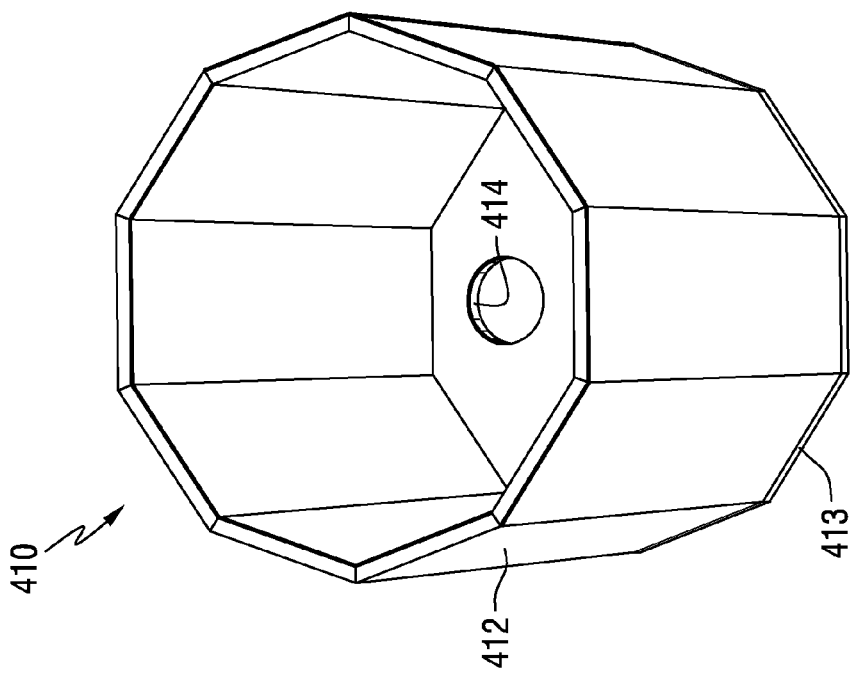
FIG. 10
FIG. 9

MAGNESIUM OXIDE CASTABLE REFRACTORY FOUNDRY LADLE LINERS

CROSS-REFERENCE TO RELATED APPLICATION

This application claims the benefit of U.S. Provisional Patent Application Ser. No. 61/703,058 filed Sep. 19, 2012, which is incorporated herein by reference.

FIELD OF THE INVENTION

The present invention relates to refractory foundry ladles, and more particularly to pre-cast ladle liners for use in foundry ladle assemblies.

BACKGROUND INFORMATION

Current foundry ladle liners include disposable refractory liners with organic binders, disposable high-alumina cast liners with inorganic binders, and foundry-installed high-alumina molded liners with inorganic binders. However, there are limitations and disadvantages associated with such conventional lining systems. Organic binder materials burn off at high temperatures, causing gasses that create non-metallic inclusions and pin hole defects in metal parts. The use of organic binders also results in the need to vent the cap material to allow gasses to escape, high permeability of liner which promotes sticking of slag, accelerated degradation of liner which become non-metallic inclusions, accelerated degradation of liner which creates exposure for a catastrophic breakout of molten metal through the wall of the ladle, accelerated degradation of liner which reduces service life, and lower mass increases speed of temperature loss between fill-ups. High-alumina lining systems do not promote clean steel pouring practices, and are more prone to slag adhesion. Foundry-installed lining systems are labor and time intensive, require special equipment and formers, require significant energy consumption, and are difficult to de-slag and de-skull after each use.

SUMMARY OF THE INVENTION

An aspect of the present invention is to provide a pre-cast refractory ladle liner for use in a foundry ladle assembly comprising at least 50 weight percent MgO aggregate based on the total weight of the liner, from 2 to 40 weight percent $Al_2O_3$ aggregate, and from 1 to 30 weight percent inorganic binder.

Another aspect of the present invention is to provide a foundry ladle assembly comprising a metal shell, a pre-cast refractory ladle liner inside the shell, and sand at least partially filling a space between the shell and the pre-cast refractory ladle liner, wherein the pre-cast liner comprises at least 50 weight percent MgO aggregate, from 2 to 40 weight percent $Al_2O_3$ aggregate, and from 1 to 30 weight percent inorganic binder.

A further aspect of the present invention is to provide a method of making a pre-cast refractory ladle liner for use in a foundry ladle assembly. The method comprises mixing MgO aggregate, $Al_2O_3$ aggregate, inorganic binder and water to produce a mixture, introducing the mixture into a mold in a shape of a ladle liner, allowing the mixture to set, and removing the set mixture from the mold in the shape of the ladle liner. The pre-cast ladle liner may then be placed inside a metal ladle shell and packed with sand. The pre-cast liner comprises from 50 to 95 weight percent MgO aggregate, from 2 to 40 weight percent $Al_2O_3$ aggregate, and from 1 to 30 weight percent inorganic binder.

These and other aspects of the present invention will be more apparent from the following description.

BRIEF DESCRIPTION OF THE DRAWINGS

FIG. 1 is an isometric view of a refractory foundry ladle liner in accordance with an embodiment of the present invention.

FIG. 2 is an isometric view of a refractory foundry ladle assembly including a liner as shown in FIG. 1 surrounded by a ladle shell and support sand in accordance with an embodiment of the present invention.

FIG. 3 is an isometric view of a refractory foundry ladle liner in accordance with another embodiment of the present invention.

FIG. 4 is an isometric view of a refractory foundry ladle assembly including a liner as shown in FIG. 3 surrounded by a ladle shell and support sand in accordance with another embodiment of the present invention.

FIG. 7 is an isometric view of a refractory foundry ladle liner in accordance with another embodiment of the present invention.

FIG. 8 is an isometric view of a refractory foundry ladle assembly including a liner as shown in FIG. 7 surrounded by a ladle shell and support sand in accordance with another embodiment of the present invention.

FIG. 9 is an isometric view of a refractory foundry ladle liner in accordance with a further embodiment of the present invention.

FIG. 10 is an isometric view of a refractory foundry ladle assembly including a liner as shown in FIG. 9 surrounded by a ladle shell and support sand in accordance with a further embodiment of the present invention.

DETAILED DESCRIPTION

Figure 6:
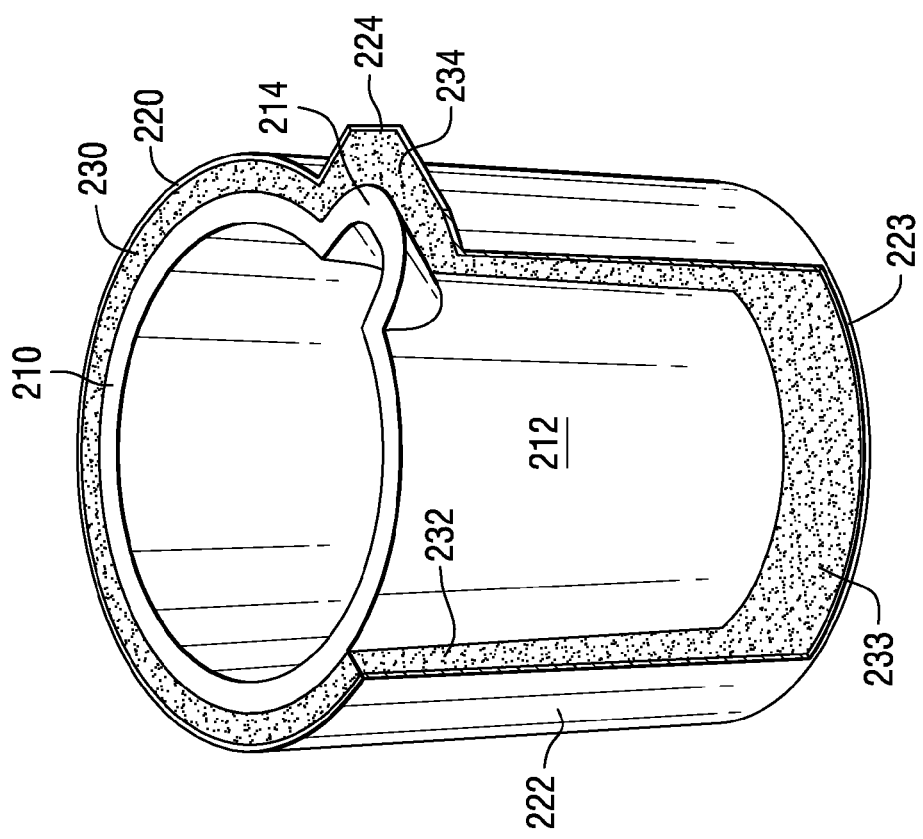
FIG. 6 is an isometric view of a refractory foundry ladle assembly including a liner as shown in FIG. 5 surrounded by a ladle shell and support sand in accordance with a further embodiment of the present invention.

The refractory foundry ladle liners of the present invention may be made from castable compositions comprising magnesium oxide-containing aggregates in combination with lesser amounts of aluminum oxide-containing aggregates and at least one inorganic binder. As used herein, the terms "foundry ladle" and "foundry ladle assemblies" include ladles, pour boxes and the like that are used to contain molten metals during various foundry operations. The ladle liners may be pre-cast. As used herein, the term "pre-cast" refers to a ladle liner that has been formed into a solid shape prior to its installation into a shell or other support structure of a refractory foundry ladle assembly. The pre-cast ladle liners are provided in monolithic form and are designed for use in various types of foundry ladle assemblies.

The MgO-containing aggregate may typically comprise from 50 to 95 weight percent of the castable ladle liner composition based on the total weight of the dry components of the castable composition, for example, from 60 to 90 weight percent. In certain embodiments, the MgO-containing aggregate may comprise from 65 to 85 weight percent, or from 80 to 82 weight percent. In certain embodiments, the magnesium oxide-containing aggregate comprises periclase. The periclase may comprise greater than 90 weight percent MgO, for example, greater than 95 weight percent MgO. The periclase may also include CaO and/or $SiO_2$, for example, with a CaO:$SiO_2$ ratio greater than 1:2, typically greater than 1:1 or greater than 2:1. The MgO-containing aggregate sizing may be less than or equal to 9 mm, for example, less than or equal to 4 mm.

The $Al_2O_3$-containing aggregate of the castable composition may typically comprise from 2 to 40 weight percent, for example, from 3 to 20 weight percent. In certain embodiments, the $Al_2O_3$-containing aggregate may comprise from 5 to 15 weight percent, or from 10 to 12 weight percent. In certain embodiments, the aluminum oxide-containing aggregate comprises calcined alumina. The calcined alumina may comprise greater than 90 weight percent of the $Al_2O_3$, for example, greater than 96 weight percent $Al_2O_3$. The aluminum oxide-containing aggregate sizing may be less than or equal to 45 microns, for example, less than 5 microns.

The inorganic binder of the castable composition may typically comprise from 1 to 30 weight percent, for example, from 2 to 10 weight percent. In certain embodiments, the inorganic binder may comprise from 3 to 8 weight percent, about 5 weight percent. In certain embodiments, the inorganic binder may comprise calcium aluminate cement. The calcium aluminate cement may comprise greater than 40 or 50 weight percent $Al_2O_3$, for example, greater than 60 or 70 weight percent $Al_2O_3$. The calcium aluminate cement may comprise less than 0.5 weight percent iron oxide. Other types of inorganic binders include hydratable alumina, colloidal silica, sodium silicate, potassium silicate, aluminum sulfate, magnesium sulfate, and the like.

In addition to the MgO-containing aggregate, $Al_2O_3$-containing aggregate and inorganic binder, the castable compositions of the present invention may optionally include up to 20 weight percent of a non-oxide ceramic additive such as carbides or nitrides. Suitable non-oxide ceramics include silicon carbide, boron nitride and the like. In certain embodiments, the non-oxide ceramic may comprise from 1 to 10 weight percent, or from 2 to 8 weight percent of the castable composition. The non-oxide ceramic additive may have a purity of greater than 90 weight percent, for example, greater than 96 weight percent. The non-oxide ceramic additive sizing may be less than or equal to 0.6 mm, for example, less than or equal to 0.15 mm.

The castable composition may further optionally include up to 2 weight percent of a dispersant additive, for example, from 0.05 to 1.5 weight percent. In certain embodiments, the dispersant may comprise from 0.75 to 1.25 weight percent of the castable composition. The dispersant additive may be any suitable dispersant known in the art, such as polymeric type dispersants.

Typical types of ladles using a cast MgO liner in accordance with embodiments of the invention include monolithic teapot ladles with integral pouring spouts, monolithic teapot ladles with separate spout units, monolithic lip-pour ladles, multi-piece teapot ladles, multi-piece bottom pour ladles, multi-piece lip pour ladles, monolithic teapot ladles with integral slag retention lids for investment casting, and multi-piece or monolithic auto-pour boxes. The ladle liners typically have wall thicknesses of greater than 1 inch, for example, the base and sidewalls of the ladle liners may be greater than 2 inches thick.

FIGS. 1 and 2 illustrate a refractory foundry ladle liner 10 in accordance with an embodiment of the present invention. The liner 10 includes a generally cylindrical sidewall 12, an integral pouring spout 14 and an internal slag retention wall 15. As shown in FIG. 2, a ladle shell 20 surrounds the liner 10. The ladle shell 20 includes a generally cylindrical sidewall 22, a base 23, and a pour spout 24. The ladle shell 20 also includes an end plate 25 located near the top of the pour spout 24 in contact with the pour spout 14 of the liner. Back-up support sand 30 fills the space between the liner 10 and shell 20. The support sand 30 includes a sidewall section 32, a base section 33, and a pour spout section 34.

FIGS. 3 and 4 illustrate a refractory foundry ladle liner 110 in accordance with another embodiment of the present invention. The liner 110 includes a generally cylindrical sidewall 112, an integral pouring spout 114 and an internal slag retention wall 115. Annular exterior ribs 113 are provided around a portion of the circumference of the sidewall 112. As shown in FIG. 4, a ladle shell 120 surrounds the liner 110, and includes a generally cylindrical sidewall 122, a base 123, and a pour spout 124. Back-up support sand 130 fills the space between the liner 110 and shell 120. The support sand 130 includes a sidewall section 132, a base section 133, and a pour spout section 134. The protruding ribs 113, or alternatively recessed dimples (not shown), can be cast integrally in the side walls to assist in holding the liner in the sand layer along with external locking devices attached to the ladle shell (not shown), if needed.

Figure 5:
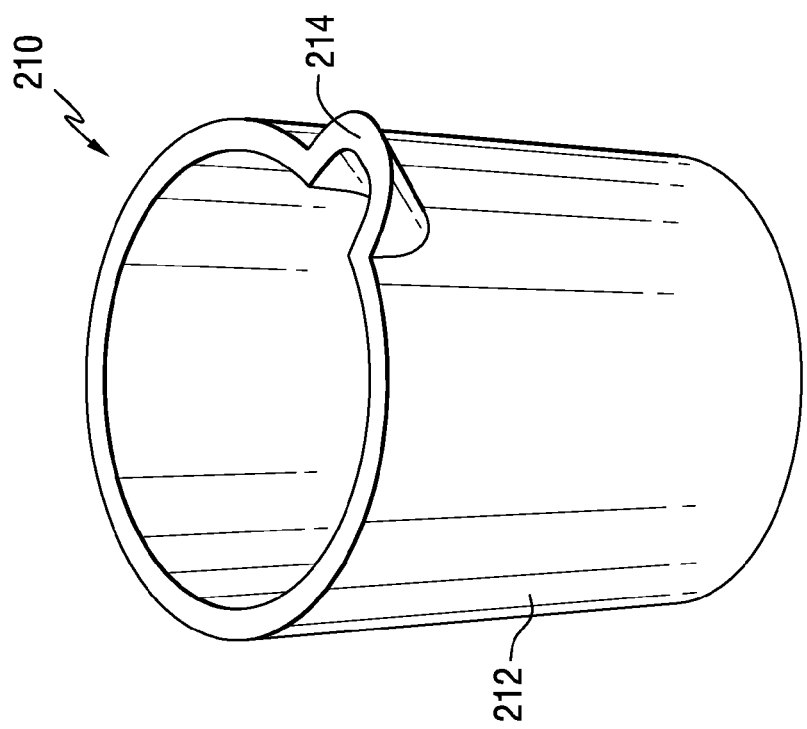
FIG. 5 is an isometric view of a refractory foundry ladle liner in accordance with a further embodiment of the present invention.

FIGS. 5 and 6 illustrate a refractory foundry ladle liner 210 in accordance with a further embodiment of the present invention. The liner 210 includes a generally cylindrical sidewall 212 and an integral pouring spout 214. As shown in FIG. 6, a ladle shell 220 surrounds the liner 210, and includes a generally cylindrical sidewall 222, a base 223, and a pour spout 224. Back-up support sand 230 fills the space between the liner 210 and shell 220. The support sand 230 includes a sidewall section 232, a base section 233, and a pour spout section 234.

FIGS. 7 and 8 illustrate a refractory foundry ladle liner 310 in accordance with another embodiment of the present invention. The liner 310 includes a faceted sidewall 312 comprising multiple flat sections and a pouring spout 314. As shown in FIG. 8, a ladle shell 320 surrounds the liner 310, and includes a generally cylindrical sidewall 322, a base 323, and a pour spout 324. Back-up support sand 330 fills the space between the liner 310 and shell 320. The support sand 330 includes a sidewall section 332, a base section 333, and a pour spout section 334.

FIGS. 9 and 10 illustrate a refractory foundry ladle liner 410 in accordance with a further embodiment of the present invention. The liner 410 includes a generally faceted sidewall 412 comprising multiple flat sections and a pouring hole 414.

As shown in FIG. 10, a ladle shell 420 surrounds the liner 410, and includes a faceted sidewall 422, a base 423, and a pour hole 424. Back-up support sand 430 fills the space between the liner 410 and shell 420. The support sand 430 includes a sidewall section 432, a base section 433, and a pour hole section 434.

Figure 12:
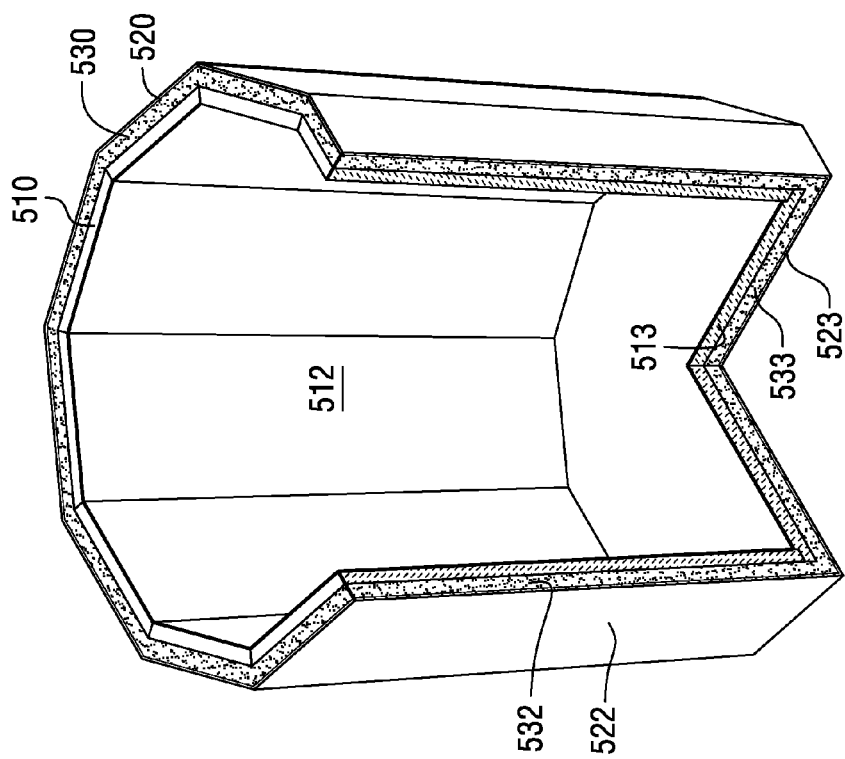
FIG. 12 is an isometric view of a refractory foundry ladle assembly including a liner as shown in FIG. 11 surrounded by a ladle shell and support sand in accordance with another embodiment of the present invention.
Figure 11:
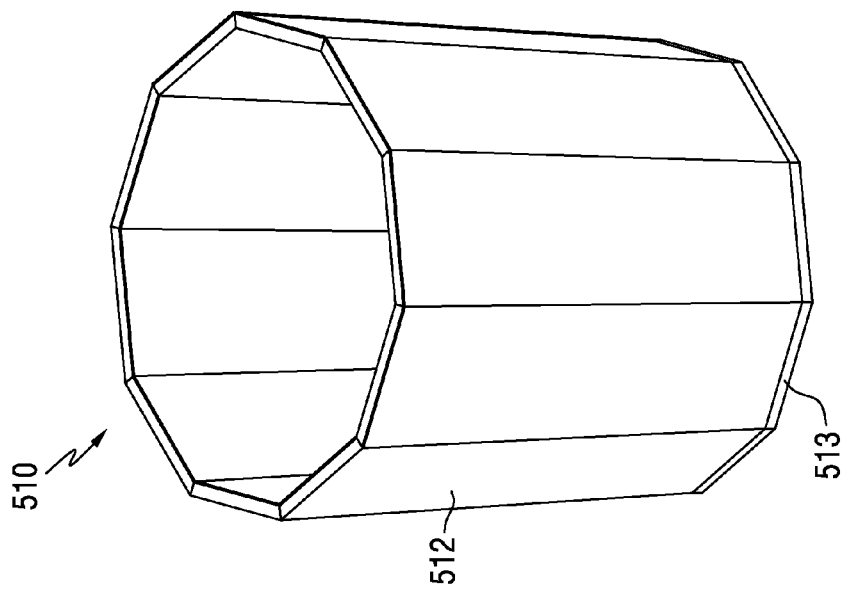
FIG. 11 is an isometric view of a refractory foundry ladle liner in accordance with another embodiment of the present invention.

FIGS. 11 and 12 illustrate a refractory foundry ladle liner 510 in accordance with another embodiment of the present invention. The liner 510 includes a generally faceted sidewall 512 comprising multiple flat sections. As shown in FIG. 12, a ladle shell 520 surrounds the liner 510, and includes a generally faceted sidewall 522 and a base 523. Back-up support sand 530 fills the space between the liner 510 and shell 520. The support sand 530 includes a sidewall section 532 and a base section 533.

Figure 14:
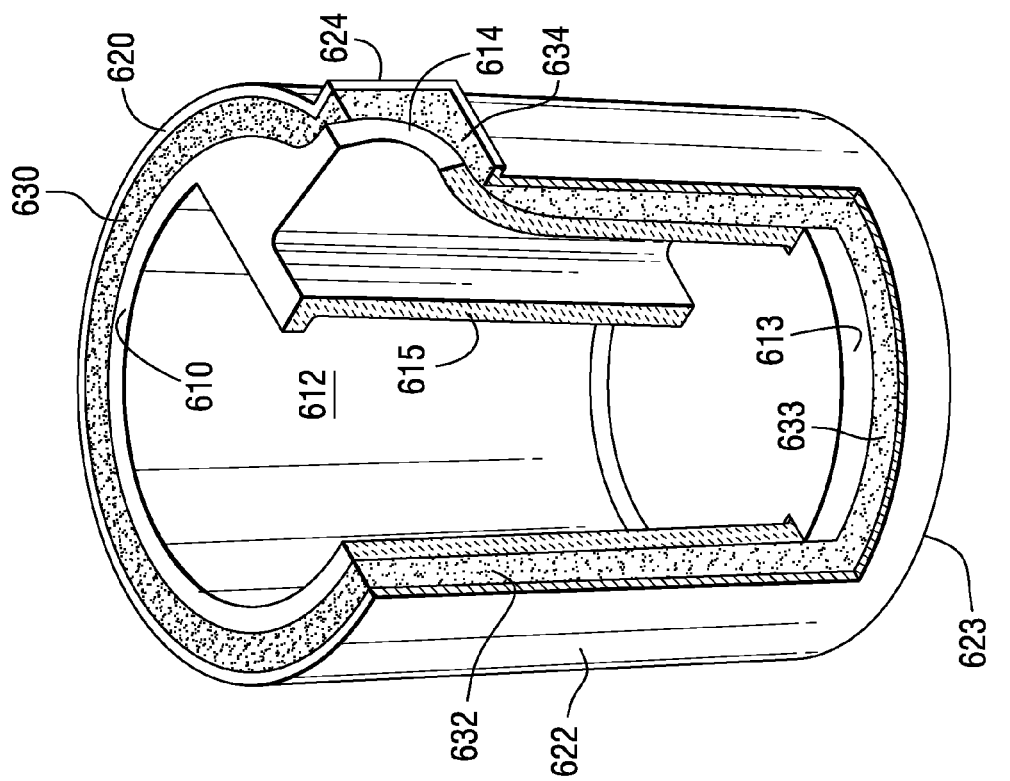
FIG. 14 is an isometric view of a refractory foundry ladle assembly including a liner as shown in FIG. 13 surrounded by a ladle shell and support sand in accordance with a further embodiment of the present invention.
Figure 13:
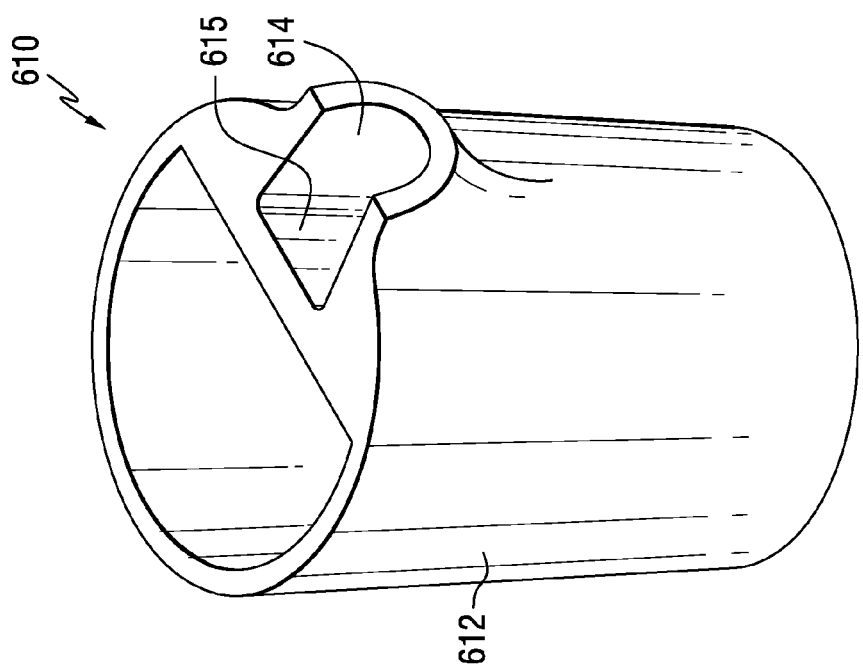
FIG. 13 is an isometric view of a refractory foundry ladle liner in accordance with a further embodiment of the present invention.

FIGS. 13 and 14 illustrate a refractory foundry ladle liner 610 in accordance with a further embodiment of the present invention. The liner 610 includes a generally cylindrical sidewall 612 and an integral pouring spout 614. The liner 610 also includes an internal slag retention wall 615. As shown in FIG. 14, a ladle shell 620 surrounds the liner 610, and includes a generally cylindrical sidewall 622, a base 623, and a pour spout 624. Back-up support sand 630 fills the space between the liner 610 and shell 620. The support sand 630 includes a sidewall section 632, a base section 633, and a pour spout section 634.

Figure 16:
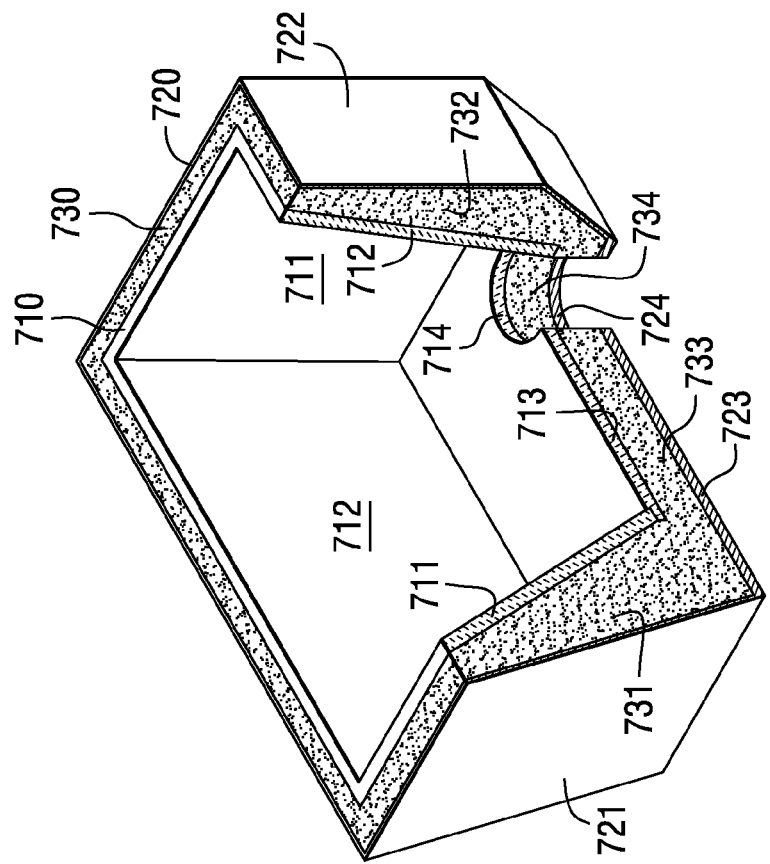
FIG. 16 is an isometric view of a refractory foundry ladle assembly including a liner as shown in FIG. 15 surrounded by a ladle shell and support sand in accordance with another embodiment of the present invention.
Figure 15:
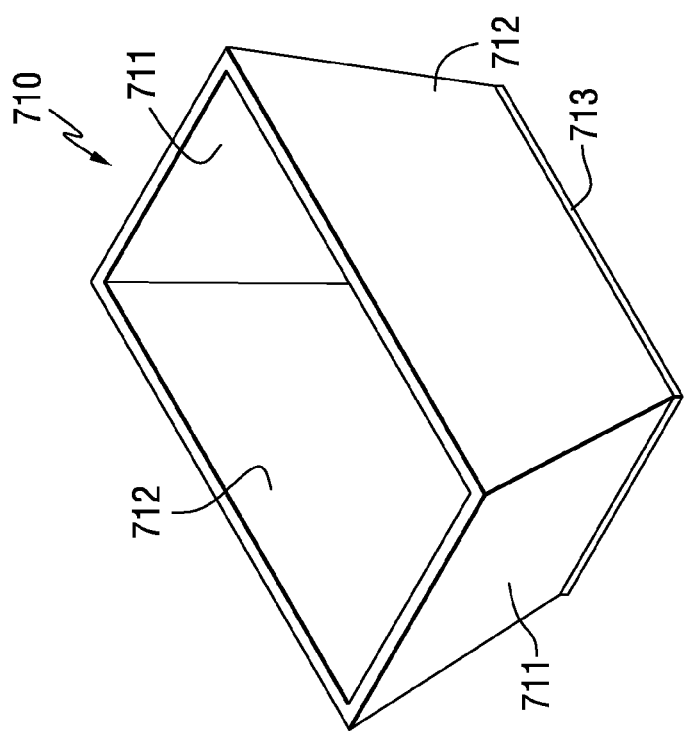
FIG. 15 is an isometric view of a refractory foundry ladle liner in accordance with another embodiment of the present invention.

FIGS. 15 and 16 illustrate a refractory foundry ladle liner 710 in accordance with another embodiment of the present invention. The liner 710 includes end walls 711, sidewalls 712 and a base 713. A pour hole 714 extends through the base 713 of the liner 710. As shown in FIG. 16, a shell 720 surrounds the liner 710, and includes end walls 721, sidewalls 722 and a base 723. The shell 720 includes a pour hole 724 formed in the base 723 directly below the pour hole 714 in the liner 710. Back-up support sand 730 fills the space between the liner 710 and shell 720. The support sand 730 includes end wall sections 731, sidewall sections 732, and a base section 733. The support sand 730 includes a pour hole section 734 extending through its base section 733.

In the various embodiments shown, the shell 20, 120, 220, 320, 420, 520, 620 and 720 may be made of any suitable material such as a metal selected from iron, carbon steel, stainless steel, and the like.

In the various embodiments, the back-up support sand 30, 130, 230, 330, 430, 530, 630 and 730 may comprise silica, olivine, alumina, alumino-silicates such as chamotte or mullite and the like typically have particle sizes of less than 6 mm, for example, less than 4 mm.

The following examples are intended to illustrate various aspects of the invention, and are not intended to limit the scope of the invention.

EXAMPLE 1

A production procedure for making an MgO-based refractory ladle liner in accordance with an embodiment of the invention is as follows. Selected amounts of periclase MgO-based aggregate, calcined alumina-based aggregate, calcium aluminate cement and any additional ingredients are mixed for sufficient time to adequately combine the ingredients, e.g., from 1 to 5 minutes. A release agent is applied to all surfaces of a ladle-liner shaped mold that will come into contact with the castable. The mold is placed on a vibrating table and an air line is attached to the pneumatic vibrator. The mixture is dry blended with a polymeric dispersant, then water is added to the mixture, e.g., in an amount of from 4 to 15 weight percent or from 6 to 9 weight percent, and mixed for sufficient time, e.g., from 1 to 10 minutes. The mixture is discharged to a transfer hopper and moved to the vibrating table to vibrate the mold as it is filled, e.g., for 1 to 3 minutes, until air bubbles are minimal on surface. The mold is then removed from the vibrating table and set on level surface. The top of the mold is trowelled, covered with plastic and then trowelled again. The mold is allowed to set, e.g., for 4 to 12 hours or more, then turned over onto a clean surface. The base and sides of mold are removed and the cast ladle liner is placed on a drying rack and moved to an oven. The ladle liner is dried, e.g., at a temperature of from 500° to 1,200° F., then allowed to oven cool, e.g., to 300° F., before removing the cooled ladle liner from the oven. The ladle liner is then cleaned, e.g., by chipping excess debris in and around the pour spout or hole, vacuuming the inside of the ladle liner, and cleaning any flashing from the outside of the ladle liner. The ladle liner may then be inspected for any cracks and imperfections that may affect its performance.

EXAMPLE 2

The following procedure may be used to produce a foundry ladle assembly in accordance with an embodiment of the invention. Sand is poured to a depth of approximately 1 inch or greater into the bottom of a cleaned metal ladle shell for seating of the liner, to thereby provide a barrier for freezing molten metal in the event of a breach in the liner, and to allow for free dumping of the liner after the end of the liner life. A pre-cast MgO-based ladle liner of the present invention is seated onto the sand layer, and additional sand is poured in to fill the gap between the liner and the shell wall to the top of the liner such that the sand supports the side walls of the liner and also performs the functions mentioned for the floor sand. The shell is then vibrated to consolidate the sand layer, and more sand is filled in until it is within approximately 2 inches of the top of the liner. The ladle shell, sand and pre-cast liner are capped with a moldable refractory medium to hold the liner and sand layer in the shell during pouring, and to prevent metal from getting behind the liner at the top. A weep hole typically used in the industry is not required. The ladle assembly may be pre-heated, e.g., to at least about 1,300° F., typically 2,000° F. or higher, for approximately one hour or longer prior to use. Molten metal may then be introduced into the pre-heated ladle for transfer or pouring. The ladle can be used multiple times. The ladle may be returned to a heating station and maintained at 1,300° F. or higher if there is a delay of greater than 4 or 5 minutes between fill-ups.

The MgO-based pre-cast ladle liners of the present invention provide several advantages. The ability to form relatively large monolithic liners having large wall thicknesses provides significant improvements over conventional ladle assemblies. Furthermore, the inorganic composition eliminates products of combustion that create non-metallic inclusions and pinhole defects in metal parts. The need for vent holes in the cap material is eliminated, thereby eliminating the tendency for the backing sand to flow out of the shell. The pre-cast liner composition significantly improves clean metal practices through the use of MgO, and reduces the adhesion of slag in the liner that can create inclusions in subsequent fill-ups. It has been found that the ladle liners possess very smooth surface finishes that improve molten metal handling during foundry operations. Furthermore, the pre-cast liner composition significantly reduces the wear of metal contact hot surfaces, which reduces the pickup of non-metallic inclusions. The reduction in wear, in turn, extends the life of the liner system. The extended life of the liner system dramatically reduces the amount of cap refractory, backup sand and labor required to build ladles. The reduction in wear also minimizes the exposure for a catastrophic breakout of molten metal through the wall of the ladle. Once hot, the increased heat capacity of the liner system helps to maintain temperature in the ladle between fill-ups, which, in turn, allows for reduced tap temperature of the metal from the furnace. The reduced amount of energy and time required to produce the molten metal results in significant energy savings and increased metal production rates.

Whereas particular embodiments of this invention have been described above for purposes of illustration, it will be evident to those skilled in the art that numerous variations of the details of the present invention may be made without departing from the invention as defined in the appended claims.

What is claimed is:

1. A pre-cast refractory ladle liner for use in a foundry ladle assembly comprising:
   at least 50 weight percent MgO aggregate based on the total weight of the liner;
   from 10 to 40 weight percent $Al_2O_3$ aggregate;
   from 1 to 30 weight percent inorganic binder; and
   from 1 to 20 weight percent of a non-oxide ceramic additive.

2. The pre-cast refractory ladle liner of claim 1, wherein the MgO aggregate comprises from 60 to 90 weight percent of the liner.

3. The pre-cast refractory ladle liner of claim 1, wherein the MgO aggregate comprises from 65 to 85 weight percent of the liner.

4. The pre-cast refractory ladle liner of claim 1, wherein the MgO aggregate comprises at least 90 weight percent periclase.

5. The pre-cast refractory ladle liner of claim 4, wherein the MgO aggregate further comprises CaO and $SiO_2$.

6. The pre-cast refractory ladle liner of claim 5, wherein the weight ratio of $CaO:SiO_2$ is greater than 1:1.

7. The pre-cast refractory ladle liner of claim 1, wherein the $Al_2O_3$ aggregate comprises from 10 to 12 weight percent of the liner.

8. The pre-cast refractory ladle liner of claim 1, wherein the $Al_2O_3$ aggregate comprises at least 90 weight percent calcined alumina.

9. The pre-cast refractory ladle liner of claim 1, wherein the inorganic binder comprises calcium aluminate cement, hydratable alumina, colloidal silica, sodium silicate, potassium silicate, aluminum sulfate, magnesium sulfate, or a combination thereof.

10. The pre-cast refractory ladle liner of claim 1, wherein the inorganic binder comprises calcium aluminate cement.

11. The pre-cast refractory ladle liner of claim 1, wherein the inorganic binder comprises from 2 to 10 weight percent of the liner.

12. The pre-cast refractory ladle liner of claim 1, wherein the non-oxide ceramic additive comprises at least one carbide or nitride in an amount of from 1 to 10 weight percent of the liner.

13. The pre-cast refractory ladle liner of claim 1, further comprising from 0.05 to 2 weight percent of a polymeric dispersant additive.

14. A foundry ladle assembly comprising:
   a metal shell;
   a pre-cast refractory ladle liner inside the shell comprising:
      at least 50 weight percent MgO aggregate based on the total weight of the liner;
      from 10 to 40 weight percent $Al_2O_3$ aggregate;
      from 1 to 30 weight percent inorganic binder; and
      from 1 to 20 weight percent of a non-oxide ceramic additive; and
   sand at least partially filling a space between the shell and the pre-cast refractory ladle liner.

15. A method of making a pre-cast refractory ladle liner for use in a foundry ladle assembly, the method comprising:
   mixing MgO aggregate, $Al_2O_3$ aggregate, inorganic binder and non-oxide ceramic additive and water to produce a mixture, wherein the MgO aggregate comprises from 50 to 95 weight percent, the $Al_2O_3$ aggregate comprises from 2 to 40 weight percent, the inorganic binder comprises from 1 to 30 weight percent, and the non-oxide ceramic additive comprises from 1 to 20 percent based on the total dry weight of the mixture;
   introducing the mixture into a mold in a shape of a ladle liner;
   vibrating the mold during or after the step of introducing the mixture into the mold;
   allowing the mixture to set; and
   removing the set mixture from the mold in the shape of the ladle liner.

16. The method of claim 15, further comprising placing the pre-cast ladle liner into a metal shell, and filling space between the shell and the pre-cast ladle liner with sand to produce the foundry ladle assembly.

17. The method of claim 15, wherein the $Al_2O_3$ aggregate comprises at least 10 weight percent based on the total dry weight of the mixture.

18. A pre-cast refractory ladle liner for use in a foundry ladle assembly comprising:
   at least 50 weight percent MgO aggregate based on the total weight of the liner;
   from 10 to 40 weight percent $Al_2O_3$ aggregate;
   from 1 to 30 weight percent inorganic binder; and
   greater than 0.05 weight percent polymeric dispersant additive.

19. A foundry ladle assembly comprising:
   a metal shell;
   a pre-cast refractory ladle liner inside the shell comprising:
      at least 50 weight percent MgO aggregate based on the total weight of the liner;
      from 10 to 40 weight percent $Al_2O_3$ aggregate;
      from 1 to 30 weight percent inorganic binder; and
      greater than 0.05 weight percent polymeric dispersant additive; and
   sand at least partially filling a space between the shell and the pre-cast refractory ladle liner.

20. A method of making a pre-cast refractory ladle liner for use in a foundry ladle assembly, the method comprising:
   mixing MgO aggregate, $Al_2O_3$ aggregate, inorganic binder, polymeric dispersant additive and water to produce a mixture, wherein the MgO aggregate comprises from 50 to 95 weight percent, the $Al_2O_3$ aggregate comprises from 2 to 40 weight percent, the inorganic binder comprises from 1 to 30 weight percent, and the polymeric dispersant additive comprises from 0.05 to 2 weight percent based on the total dry weight of the mixture;
   introducing the mixture into a mold in a shape of a ladle liner;
   vibrating the mold during or after the step of introducing the mixture into the mold;
   allowing the mixture to set; and
   removing the set mixture from the mold in the shape of the ladle liner.

* * * * *